(12) United States Patent
Guo (10) Patent No.: US 12,030,167 B2
(45) Date of Patent: Jul. 9, 2024

(54) FALSE TRIGGERING PREVENTION DEVICE FOR SPINDLE SELF-LOCKING MECHANISM OF ELECTRIC TOOL

(71) Applicants: KEN HOLDING CO., LTD., Shanghai (CN); ZHEJIANG KEN TOOLS CO., LTD., Jiaxing (CN)

(72) Inventor: Aicheng Guo, Shanghai (CN)

(73) Assignees: KEN HOLDING CO., LTD., Shanghai (CN); ZHEJIANG KEN TOOLS CO., LTD., Jiaxing (CN)

( * ) Notice: Subject to any disclaimer, the term of this patent is extended or adjusted under 35 U.S.C. 154(b) by 375 days.

(21) Appl. No.: 17/637,069

(22) PCT Filed: Oct. 18, 2019

(86) PCT No.: PCT/CN2019/111980
§ 371 (c)(1),
(2) Date: Feb. 21, 2022

(87) PCT Pub. No.: WO2021/031323
PCT Pub. Date: Feb. 25, 2021

(65) Prior Publication Data
US 2022/0288761 A1 Sep. 15, 2022

(30) Foreign Application Priority Data
Aug. 22, 2019 (CN) .......................... 201910778593.7

(51) Int. Cl.
*B25F 5/00* (2006.01)
*B24B 47/10* (2006.01)
*F16D 63/00* (2006.01)

(52) U.S. Cl.
CPC ............ *B25F 5/001* (2013.01); *F16D 63/006* (2013.01)

(58) Field of Classification Search
CPC ......... B24B 23/00; B24B 47/10; B25F 5/001; F16D 63/006
See application file for complete search history.

(56) References Cited

U.S. PATENT DOCUMENTS

| 4,009,846 A * | 3/1977 | Coruzzi | ................. G11B 15/50 |
| | | | 242/356.6 |
| 7,966,854 B2 * | 6/2011 | Imedio | ................. E05B 47/0642 |
| | | | 192/69.62 |

(Continued)

FOREIGN PATENT DOCUMENTS

| CN | 103286689 A | 9/2013 |
| CN | 104985572 A | 10/2015 |

(Continued)

*Primary Examiner* — Thomas W Irvin
(74) *Attorney, Agent, or Firm* — Bayramoglu Law Offices LLC (57) ABSTRACT

A false triggering prevention device for a spindle self-locking mechanism of an electric tool, includes a blocking member and an elastic element, where the blocking member includes a rotating portion, a connecting portion and a blocking portion that are sequentially connected to one another; one end of the elastic element is connected to a gear; the other end of the elastic element is connected to the connecting portion; the rotating portion is rotatably connected to a self-locking surface of the gear, such that the blocking member has a rotating state and a static state; when the blocking member is in the rotating state, the blocking portion covers a self-locking hole to prevent insertion of the self-locking pin into the self-locking hole; and when the blocking member is in the static state, the blocking portion does not cover the self-locking hole.

14 Claims, 5 Drawing Sheets

(56) References Cited

U.S. PATENT DOCUMENTS

| | | | | |
|---|---|---|---|---|
| 10,166,609 | B2* | 1/2019 | Zhou | B23B 31/123 |
| 11,086,351 | B2* | 8/2021 | Tian | G05G 5/12 |
| 11,396,078 | B2* | 7/2022 | Numata | B25F 5/006 |
| 11,400,578 | B2* | 8/2022 | Furusawa | B25F 5/02 |
| 11,472,018 | B2* | 10/2022 | Numata | B24B 23/005 |
| 11,915,890 | B2* | 2/2024 | Huang | H01H 21/24 |
| 2009/0145520 | A1* | 6/2009 | Opsitos, Jr. | B23B 45/02 |
| | | | | 144/365 |
| 2017/0304906 | A1* | 10/2017 | Zhou | B23B 31/123 |
| 2018/0117728 | A1* | 5/2018 | Kawakami | B25F 5/008 |
| 2019/0187743 | A1* | 6/2019 | Tian | G05G 5/18 |
| 2020/0316767 | A1* | 10/2020 | Furusawa | B25F 5/02 |
| 2021/0094164 | A1* | 4/2021 | Numata | B25F 5/008 |
| 2021/0193413 | A1* | 6/2021 | Huang | E21B 11/005 |
| 2024/0068550 | A1* | 2/2024 | Cen | F16H 25/229 |

FOREIGN PATENT DOCUMENTS

| | | |
|---|---|---|
| CN | 106499677 A | 3/2017 |
| CN | 206280485 U | 6/2017 |
| CN | 109909831 A | 6/2019 |
| JP | 2016011676 A | 1/2016 |

* cited by examiner

FALSE TRIGGERING PREVENTION DEVICE FOR SPINDLE SELF-LOCKING MECHANISM OF ELECTRIC TOOL

CROSS REFERENCE TO THE RELATED APPLICATIONS

This application is the national phase entry of International Application No. PCT/CN2019/111980, filed on Oct. 18, 2019, which is based upon and claims priority to Chinese Patent Application No. 201910778593.7, filed on Aug. 22, 2019, the entire contents of which are incorporated herein by reference.

TECHNICAL FIELD

The present disclosure relates to the field of electric tools, and in particular, to a false triggering prevention device for a spindle self-locking mechanism of an electric tool.

BACKGROUND

A self-locking pin is provided on reduction gearboxes of most electric tools. The self-locking pin can move axially along the spindle of the reduction gearbox and is engaged with the corresponding hole on the gear, thus preventing continuous rotation of the gear. When a tool bit is assembled or disassembled, the switch for the self-locking pin is manually triggered, and the self-locking pin is inserted into the corresponding hole on the gear to keep both the gear and the spindle in a static state. The self-locking pin and the corresponding hole on the gear constitute a spindle self-locking mechanism of the electric tool.

However, during the operation of the electric tool, or in a case where the electric tool is turned off but the tool bit has not yet stopped, as the spindle self-locking mechanism of the electric tool is not provided with a triggering prevention device, accidentally triggering the self-locking mechanism will cause a series of serious adverse consequences. For example, due to an inertial force, the big gear and the self-locking pin are damaged, teeth on the driving gear and driven gear are broken, and the motor stalling occurs to burn the machine; even the tool bit, such as grinding blade and saw blade, may be damaged due to inertia, so as to cause accidental injuries.

SUMMARY

A technical problem to be solved by the present disclosure is to provide a false triggering prevention device for a spindle self-locking mechanism of an electric tool, so as to overcome the defect that during the operation of the electric tool, or in a state that the electric tool is turned off but the tool bit has not yet stopped, as the spindle self-locking mechanism of the electric tool is not provided with the triggering prevention device, accidentally triggering the spindle self-locking mechanism of the electric tool will cause a series of serious adverse consequences in the prior art.

The present disclosure solves the technical problem with the following technical solutions:

A false triggering prevention device for a spindle self-locking mechanism of an electric tool is used for preventing the spindle self-locking mechanism of the electric tool from being accidentally triggered. The spindle self-locking mechanism of the electric tool includes a self-locking pin and a gear; the gear is connected to a spindle; at least one self-locking hole is formed in the gear; the self-locking pin is inserted into the self-locking hole for locking, or, the self-locking pin is disengaged from the self-locking hole for unlocking; and the false triggering prevention device for a spindle self-locking mechanism of an electric tool includes a blocking member and an elastic element, where the blocking member includes a rotating portion, a connecting portion and a blocking portion that are sequentially connected to one another; one end of the elastic element is connected to the gear; the other end of the elastic element is connected to the connecting portion; the rotating portion is rotatably connected to a self-locking surface of the gear, such that the blocking member has a rotating state and a static state; the self-locking surface is a surface where the self-locking hole of the gear is located; and when the blocking member is in the rotating state, the blocking member covers the self-locking hole to prevent insertion of the self-locking pin into the self-locking hole; and when the blocking member is in the static state, the blocking portion does not cover the self-locking hole.

According to the solution, the self-locking surface of the gear is the surface where the self-locking hole of the gear is located, and the rotatable blocking member and the elastic element are connected to the gear. When the gear rotates, the blocking portion of the blocking member under a centrifugal force rotates around the rotating portion to cover the self-locking hole on the gear, thus preventing the insertion of the self-locking pin into the self-locking hole. In this case, the elastic element is compressed. When the gear stops, the blocking portion under a restoring force of the elastic element rotates around the rotating portion toward a direction close to the spindle, and the self-locking hole is not covered by the blocking portion. In this case, the self-locking pin can be inserted into the self-locking hole to lock the spindle. The solution has the simple structure, fewer parts, small size, and can prevent false triggering of the spindle self-locking mechanism of the electric tool, thereby avoiding a series of serious adverse consequences and ensuring the safety of equipment and personnel.

Preferably, a first gap may be formed in the blocking portion; when the blocking member is in the static state, the first gap may coincide with the self-locking hole and expose the self-locking hole; and when the blocking member is in the rotating state, the first gap may deviate from the self-locking hole, and the self-locking hole may be covered by the blocking portion.

According to the solution, the first gap is formed in the blocking portion. When the gear does not rotate, the self-locking hole just exposes the first gap. The first gap has a position yielding action, such that the self-locking pin locks the spindle more accurately.

Preferably, a side of the blocking member close to the spindle may be provided with a second gap, and the second gap may be matched with an outer surface of the spindle and abut against the spindle.

According to the solution, the second gap for matching with the spindle is formed in the blocking member. In the static state, the blocking member just stops on the second gap and abuts against the spindle, and the first gap just exposes the self-locking hole. Therefore, the second gap facilitates the position location.

Preferably, a groove may be formed in the self-locking surface of the gear, and the blocking member and the elastic element may be arranged in the groove.

According to the solution, the blocking member and the elastic element are arranged in the groove. In the rotating state, the sidewall of the groove can limit the blocking portion to prevent a phenomenon that the blocking portion rotates and cannot cover the self-locking hole. Such a structure is simple and can limit the blocking portion.

Preferably, a through hole may be formed in the rotating portion, and a pin shaft passes through the through hole to make the rotating portion be rotatably connected to a bottom of the groove.

According to the solution, the rotating portion is rotatably connected to the gear through the pin shaft, such that the blocking portion can rotate around the rotating portion. The structure is simple, and fewer parts are used.

Preferably, a side of the connecting portion facing toward the elastic element may be provided with a rebound groove, one end of the elastic element may be connected to the gear, and the other end of the elastic element may be connected to a bottom of the rebound groove.

According to the solution, the rebound groove is formed in the connecting portion. Therefore, when the gear stops, the elastic element applies a rebound force to the blocking member and makes the blocking portion reset automatically. On the other hand, the rebound groove can further guide and locate the spring, such that the blocking member covers or exposes the self-locking hole more accurately.

Preferably, the elastic element may be a spring.

Preferably, a number of blocking members may correspond to a number of self-locking holes.

According to the solution, the number of blocking members corresponds to the number of self-locking holes, which is helpful to improve the accuracy for preventing the false triggering.

On the basis of conforming to common knowledge in the art, the above-mentioned preferred conditions can be combined arbitrarily to obtain preferred embodiments of the present disclosure.

The present disclosure has the following beneficial effects: The false triggering prevention device for a spindle self-locking mechanism of an electric tool is provided on the gear of the electric tool. The self-locking hole on the gear is covered during the operation of the electric tool, to prevent the spindle self-locking mechanism of the electric tool from being accidentally triggered. The false triggering prevention device for a spindle self-locking mechanism of an electric tool provided by the present disclosure has the simple structure, fewer parts, a small size, and can prevent false triggering of the spindle self-locking mechanism of the electric tool, thereby avoiding a series of serious adverse consequences and ensuring the safety of equipment and personnel.

REFERENCE NUMERALS blocking member 10
rotating portion 101
through hole 1011
connecting portion 102
blocking portion 103
first gap 104
second gap 105
rebound groove 106
spring 20
spindle 30
gear 40
groove 401
self-locking hole 402
self-locking surface 403
self-locking pin 50
pin shaft 60

DETAILED DESCRIPTION OF THE EMBODIMENTS

The present disclosure will be further described below with embodiments in combination with accompanying drawings, but the present disclosure is not limited to the scope of the described embodiments.

As shown in FIG. 1 to FIG. 5, the present disclosure provides a false triggering prevention device for a spindle self-locking mechanism of an electric tool, which is used for preventing the spindle 30 self-locking mechanism of the electric tool from being accidentally triggered. The spindle 30 self-locking mechanism of the electric tool includes a self-locking pin 50 and a gear 40; the gear 40 is connected to a spindle 30; at least one self-locking hole 402 is formed in the gear 40; the self-locking pin 50 is inserted into the self-locking hole 402 for locking, or, the self-locking pin 50 is disengaged from the self-locking hole 402 for unlocking; and the false triggering prevention device for a spindle self-locking mechanism of an electric tool includes a blocking member 10 and an elastic element, where the blocking member 10 includes a rotating portion 101, a connecting portion 102 and a blocking portion 103 that are sequentially connected to one another; one end of the elastic element is connected to the gear 40; the other end of the elastic element is connected to the connecting portion 102; the rotating portion 101 is rotatably connected to a self-locking surface 403 of the gear 40, the self-locking surface 403 of the gear being a surface where the self-locking hole of the gear is located, such that the blocking member 10 has a rotating state and a static state; when the blocking member 10 is in the rotating state, the blocking portion 103 covers the self-locking hole 402 to prevent insertion of the self-locking pin 50 into the self-locking hole 402; and when the blocking member 10 is in the static state, the blocking portion 103 does not cover the self-locking hole 402.

The rotatable blocking member 10 and the elastic element are connected to the gear 40. When the gear 40 rotates, the blocking portion 103 of the blocking member 10 under a centrifugal force rotates around the rotating portion 101 to cover the self-locking hole 402 on the gear 40, thus preventing the insertion of the self-locking pin 50 into the self-locking hole 402. In this case, the elastic element is compressed. When the gear 40 stops, the blocking portion 103 under a restoring force of the elastic element rotates around the rotating portion 101 toward a direction of the spindle 30, and the self-locking hole 402 is not covered by the blocking portion 103. In this case, the self-locking pin 50 can be inserted into the self-locking hole 402 to lock the spindle 30. The solution has the simple structure, fewer parts, a small size, and can prevent false triggering of the spindle 30 self-locking mechanism of the electric tool, thereby avoiding a series of serious adverse consequences and ensuring the safety of equipment and personnel.

Figure 1:
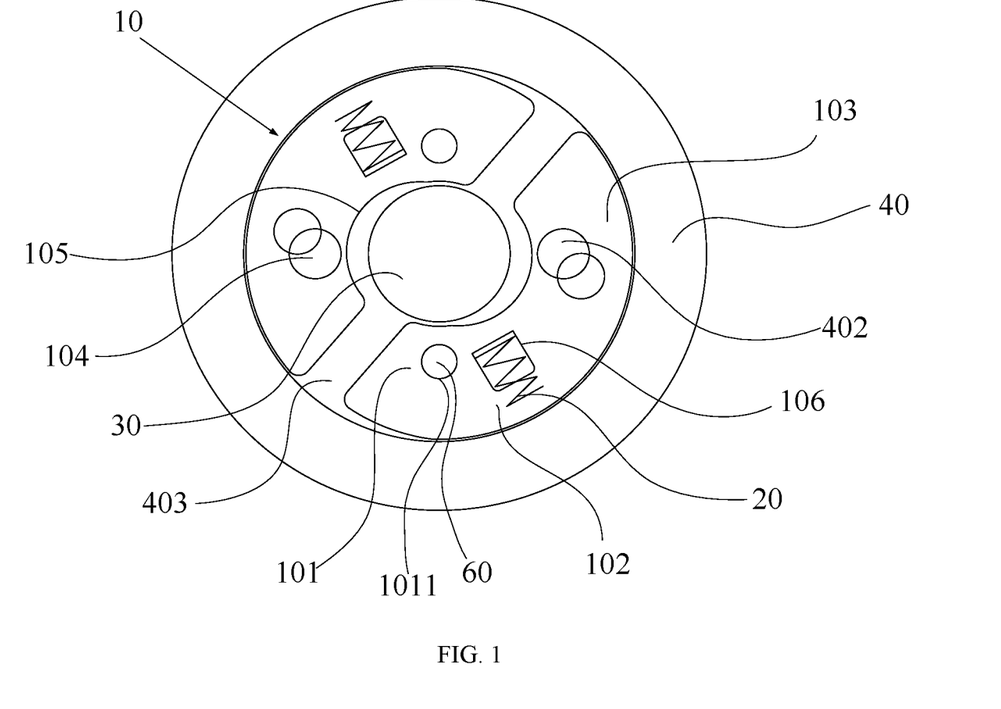
FIG. 1 is a top view of a false triggering prevention device for a spindle self-locking mechanism of an electric tool when a spindle is in a rotating state according to a preferred embodiment of the present disclosure.
Figure 5:
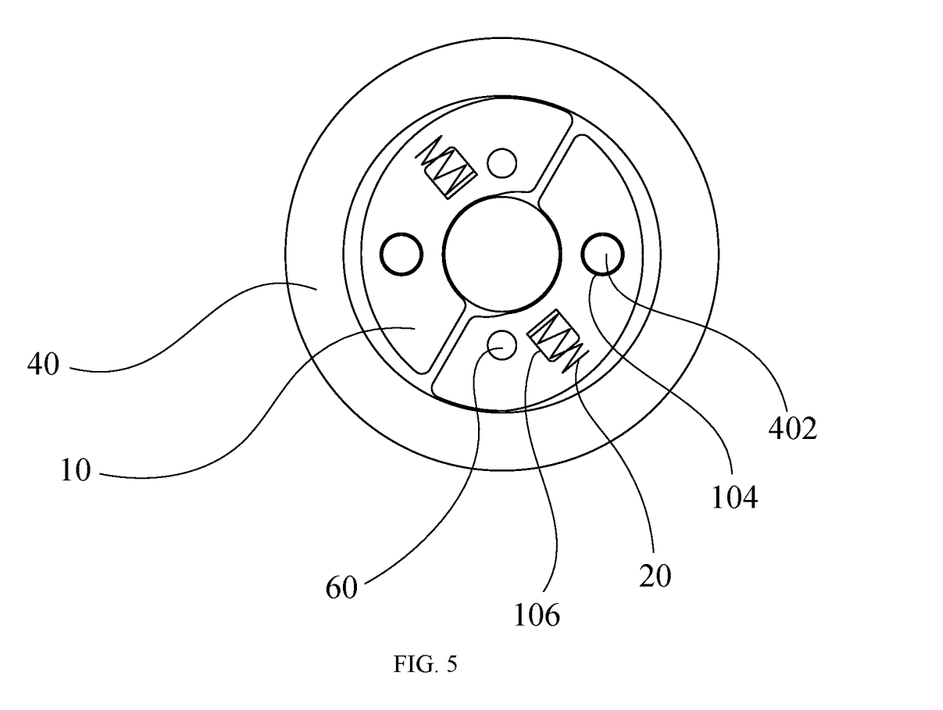
FIG. 5 is a top view of a false triggering prevention device for a spindle self-locking mechanism of an electric tool when a spindle is in a static state according to a preferred embodiment of the present disclosure.

As shown in FIG. 1 and FIG. 5, a first gap 104 is formed in the blocking portion 103; when the blocking member 10 is in the static state, the first gap 104 coincides with the self-locking hole 402 and exposes the self-locking hole 402; and when the blocking member 10 is in the rotating state, the first gap 104 deviates from the self-locking hole 402, and the self-locking hole 402 is covered by the blocking portion 103. The first gap 104 is formed in the blocking portion 103. When the gear 40 does not rotate, the self-locking hole 402 just exposes the first gap 104. The first gap 104 has a position yielding action, such that the self-locking pin 50 locks the spindle 30 more accurately.

It is to be noted that there are no limits made on the shape and position of the first gap 104. The gap may be a semicircular gap at a side of the blocking portion 103 away from the spindle 30 and along an edge of the blocking member 10, and may also be a circular gap in a middle of the blocking portion 103, which is determined by the shape and size of the blocking member 10. Certainly, the latter is used in the embodiment.

As shown in FIG. 1 and FIG. 5, a side of the blocking member 10 close to the spindle 30 is provided with a second gap 105, and the second gap 105 is matched with an outer surface of the spindle 30 and abuts against the spindle 30. The second gap 105 for matching with the spindle 30 is formed in the blocking member 10. In the static state, the blocking member 10 just stops on the second gap 104 and abuts against the spindle 30, and the first gap 105 just exposes the self-locking hole 402. Therefore, the second gap 105 facilitates the position location.

Figure 2:
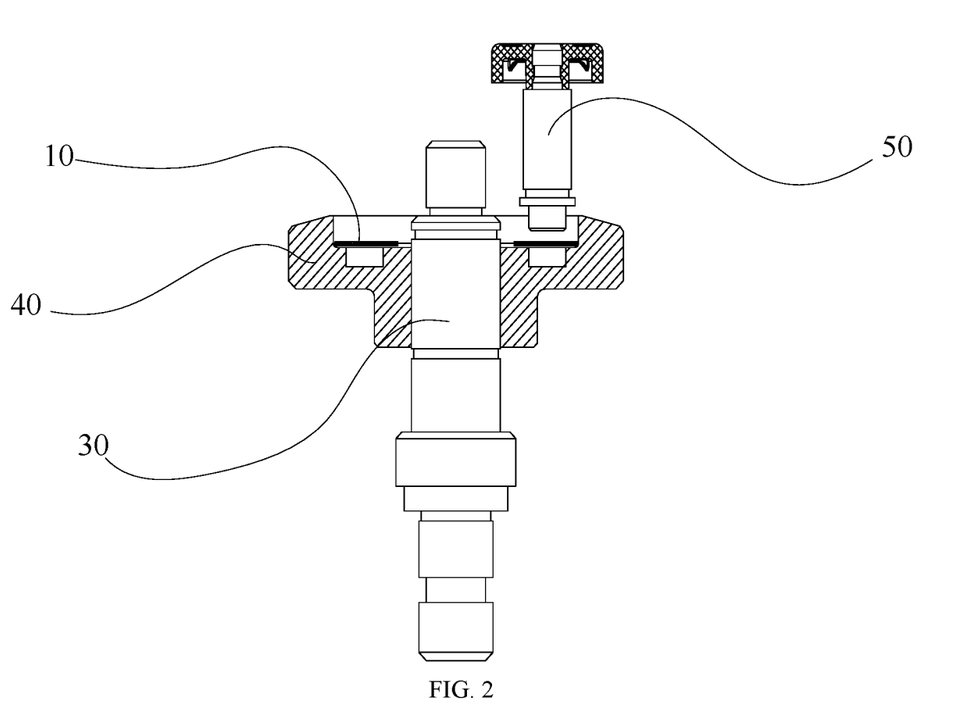
FIG. 2 is a sectional view of a false triggering prevention device for a spindle self-locking mechanism of an electric tool in an axial direction when a spindle in a rotating state is on a connecting line of two self-locking holes according to a preferred embodiment of the present disclosure.
Figure 3:
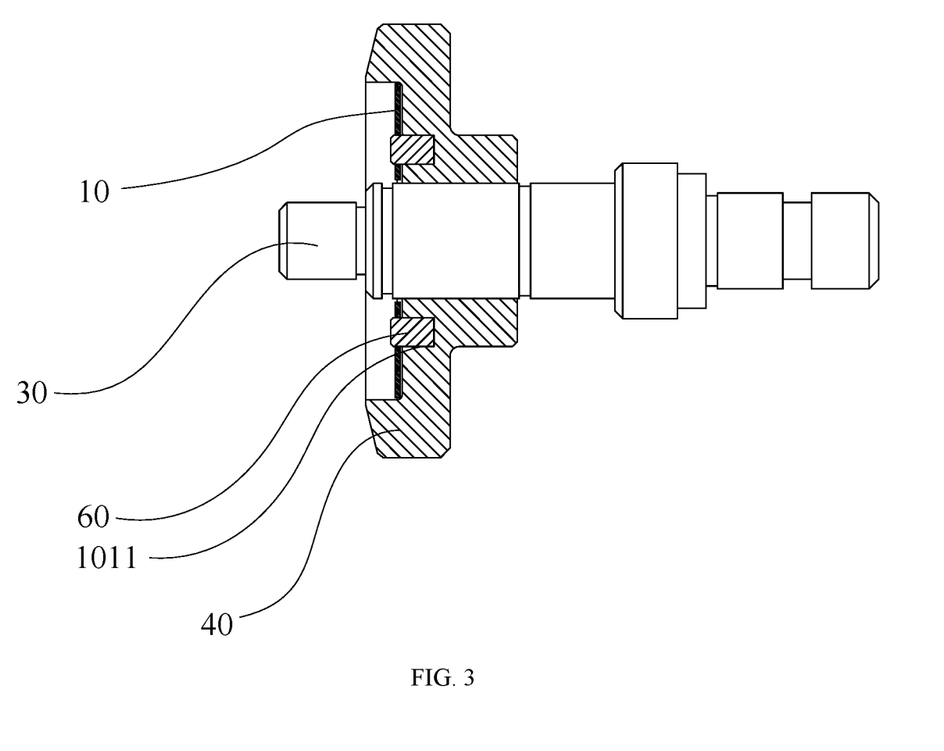
FIG. 3 is a sectional view of a false triggering prevention device for a spindle self-locking mechanism of an electric tool in an axial direction when a spindle in a rotating state is on a connecting line of two pin shafts according to a preferred embodiment of the present disclosure.
Figure 4:
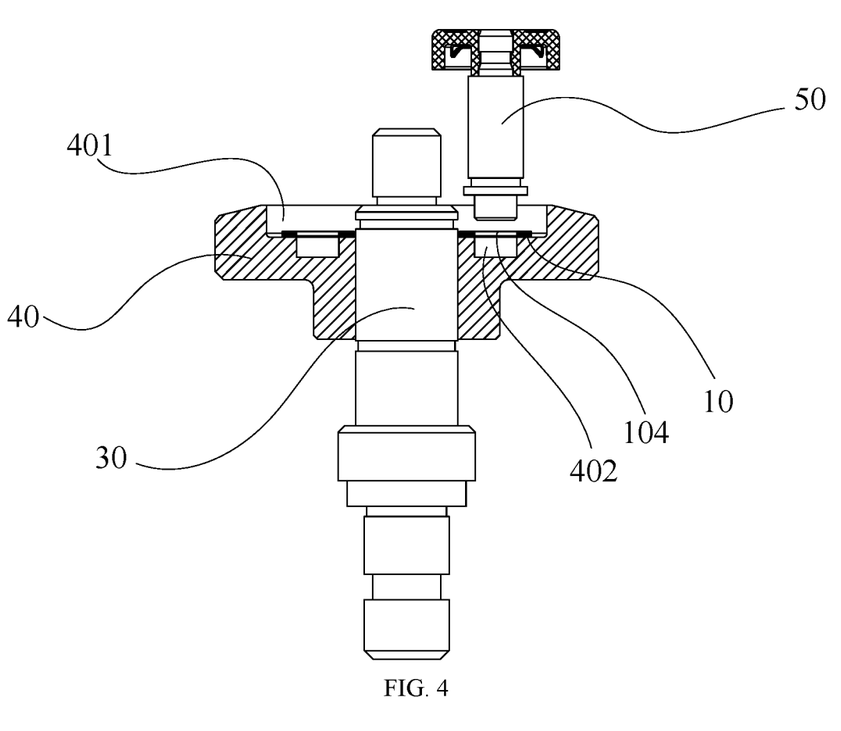
FIG. 4 is a sectional view of a false triggering prevention device for a spindle self-locking mechanism of an electric tool in an axial direction when a spindle in a static state is on a connecting line of two self-locking holes according to a preferred embodiment of the present disclosure.

As shown in FIG. 2, FIG. 3 and FIG. 4, a groove 401 is formed in the self-locking surface 403 of the gear 40, and the blocking member 10 and the elastic element are arranged in the groove 401. The blocking member 10 and the elastic element are arranged in the groove 401. In the rotating state, the sidewall of the groove 401 can limit the blocking portion 103 to prevent a phenomenon that the blocking portion 103 rotates and cannot cover the self-locking hole 402. Such a structure is simple and can limit the blocking portion 103.

A through hole 1011 is formed in the rotating portion 101, and a pin shaft 60 passes through the through hole 1011 to make the rotating portion 101 be rotatably connected to a bottom of the groove 401. The rotating portion 101 is rotatably connected to the gear 40 through the pin shaft 60, such that the blocking portion 103 can rotate around the rotating portion 101. The structure is simple, and fewer parts are used.

As shown in FIG. 1 and FIG. 5, a side of the connecting portion 102 facing toward the elastic element is provided with a rebound groove 106, one end of the elastic element is connected to the gear 40, and the other end of the elastic element is connected to a bottom of the rebound groove 106. The rebound groove 106 is formed in the connecting portion 102. Therefore, when the gear 40 stops, the elastic element applies a rebound force to the blocking member 10 and makes the blocking portion 103 reset automatically. On the other hand, the rebound groove 106 can further guide and locate the spring 20, such that the blocking member 10 covers or exposes the self-locking hole 402 more accurately.

The elastic element is a spring 20. A number of blocking members 10 corresponds to a number of self-locking holes 402. The number of blocking members 10 corresponds to the number of self-locking holes 402, which is helpful to improve the accuracy for preventing the false triggering.

As shown in FIG. 1 to FIG. 5, in the embodiment, the gear 40 connected to the spindle 30 on the electric tool is provided with two self-locking holes 402. The self-locking pin 50 is connected to a reduction gearbox. The self-locking pin 50 can move axially and is inserted into any self-locking hole 402 to limit rotation of the spindle 30. When the self-locking pin 50 is disengaged from the self-locking hole 402, the spindle 30 is unlocked. The groove 401 is formed in the self-locking surface 403 of the gear 40. In the embodiment, the blocking member 10 is a semicircular false triggering prevention gasket. One end of the blocking member 10 is connected to the bottom of the groove 401 through the pin shaft 60. The blocking member 10 can rotate around the pin shaft 60. On the false triggering prevention gasket, the rebound groove 106 is formed in an end connected to the gear 40 and a side facing toward the sidewall of the groove 401. There are no limits made on the shape of the rebound groove 106. The bottom of the rebound groove is connected to the spring 20. The other end of the spring 20 is connected to the sidewall of the groove 401. The first gap 104 is formed in the other end of the blocking member 10. A side of the blocking member 10 close to the spindle 30 is provided with the second gap 105 in the middle. The second gap 105 is just coupled with the spindle 30. The first gap 104 is used for yielding a position for the self-locking hole 402. The second gap 105 is used for locating the blocking member 10.

Continuously referring to FIG. 1 to FIG. 5, the false triggering prevention device for a spindle self-locking mechanism of an electric tool in the embodiment has the following working principles: When the spindle 30 is in the rotating state, the gear 40 rotates with the spindle 30. The blocking portion 103 of the blocking member 10 under a centrifugal force rotates along a direction away from the spindle 30. In this case, the first gap 104 deviates from the self-locking hole 402, the blocking portion 103 covers the self-locking hole 402, and the spring 20 is compressed. Even through the switch of the spindle 30 self-locking mechanism is falsely triggered, the self-locking pin 50 still cannot be inserted into the self-locking hole 402. When the electric tool is turned off, after the spindle 30 stops completely, the spring 20 applies a rebound force to the bottom of the rebound groove 106 under a restoring force of the spring 20. The blocking portion 103 of the blocking member 10 under the rebound force rotates along a direction close to the spindle 30, the second gap 105 is coupled with the spindle 30, and the self-locking hole 402 exposes the first gap 104. In this case, the self-locking pin 50 can be inserted into the self-locking hole 402 to lock the spindle 30 of the electric tool.

It is to be noted that any electric tool in which an axis of the self-locking pin in the spindle self-locking mechanism and an axis of the spindle are parallel to each other can be provided with the false triggering prevention device for a spindle self-locking mechanism of an electric tool provided by the present disclosure to prevent the spindle self-locking mechanism from being accidentally triggered, such as the miter saw, angle grinder and polisher. The false triggering prevention device for a spindle self-locking mechanism of an electric tool provided by the present disclosure has the simple structure, fewer parts, small size, and can prevent accidental triggering of the spindle self-locking mechanism of the electric tool, thus ensuring the safety and reliability.

Although the specific embodiments of the present disclosure have been described above, those skilled in the art should understand that these are only embodiments, and the protection scope of the present disclosure is defined by the appended claims. Those skilled in the art can make various changes or modifications to these examples without departing from the principle and essence of the present disclosure, but all these changes and modifications shall fall within the protection scope of the present disclosure.

What is claimed is:

1. A false triggering prevention device for a spindle self-locking mechanism of an electric tool, wherein
the spindle self-locking mechanism of the electric tool comprises a self-locking pin and a gear, wherein the gear is connected to a spindle, at least one self-locking hole is formed in the gear, the self-locking pin is inserted into the at least one self-locking hole to lock the spindle, or, the self-locking pin is disengaged from the at least one self-locking hole to unlock the spindle;
the false triggering prevention device for the spindle self-locking mechanism of the electric tool comprises a blocking member and an elastic element, wherein the blocking member comprises a rotating portion, a connecting portion and a blocking portion, the a rotating portion, the connecting portion and the blocking portion are sequentially connected to one another; a first end of the elastic element is connected to the gear; a second end of the elastic element is connected to the connecting portion; and the rotating portion is rotatably connected to a self-locking surface of the gear, such that the blocking member has a rotating state and a static state;
when the blocking member is in the rotating state, the blocking portion covers the at least one self-locking hole to prevent the self-locking pin from being inserted into the at least one self-locking hole; and
when the blocking member is in the static state, the blocking portion does not cover the at least one self-locking hole.

2. The false triggering prevention device according to claim 1, wherein a first gap is formed in the blocking portion; when the blocking member is in the static state, the first gap coincides with the at least one self-locking hole and exposes the at least one self-locking hole; and when the blocking member is in the rotating state, the first gap deviates from the at least one self-locking hole, and the at least one self-locking hole is covered by the blocking portion.

3. The false triggering prevention device according to claim 2, wherein a number of blocking members corresponds to a number of self-locking holes.

4. The false triggering prevention device according to claim 1, wherein a side of the blocking member close to the spindle is provided with a second gap, and the second gap is matched with an outer surface of the spindle and abuts against the spindle.

5. The false triggering prevention device according to claim 4, wherein a number of blocking members corresponds to a number of self-locking holes.

6. The false triggering prevention device according to claim 1, wherein a groove is formed in the self-locking surface, and the blocking member and the elastic element are arranged in the groove.

7. The false triggering prevention device according to claim 4, wherein a through hole is formed in the rotating portion, and a pin shaft passes through the through hole to make the rotating portion be rotatably connected to a bottom of the groove.

8. The false triggering prevention device according to claim 7, wherein a number of blocking members corresponds to a number of self-locking holes.

9. The false triggering prevention device according to claim 6, wherein a number of blocking members corresponds to a number of self-locking holes.

10. The false triggering prevention device according to claim 1, wherein a side of the connecting portion facing toward the elastic element is provided with a rebound groove, a first end of the elastic element is connected to the gear, and a second end of the elastic element is connected to a bottom of the rebound groove.

11. The false triggering prevention device according to claim 10, wherein a number of blocking members corresponds to a number of self-locking holes.

12. The false triggering prevention device according to claim 1, wherein the elastic element is a spring.

13. The false triggering prevention device according to claim 12, wherein a number of blocking members corresponds to a number of self-locking holes.

14. The false triggering prevention device according to claim 1, wherein a number of blocking members corresponds to a number of self-locking holes.

* * * * *